March 17, 1970     R. J. BRESSON ET AL     3,500,731
ADJUSTABLE LOW-LIGHT SIGNAL
Filed Dec. 6, 1967
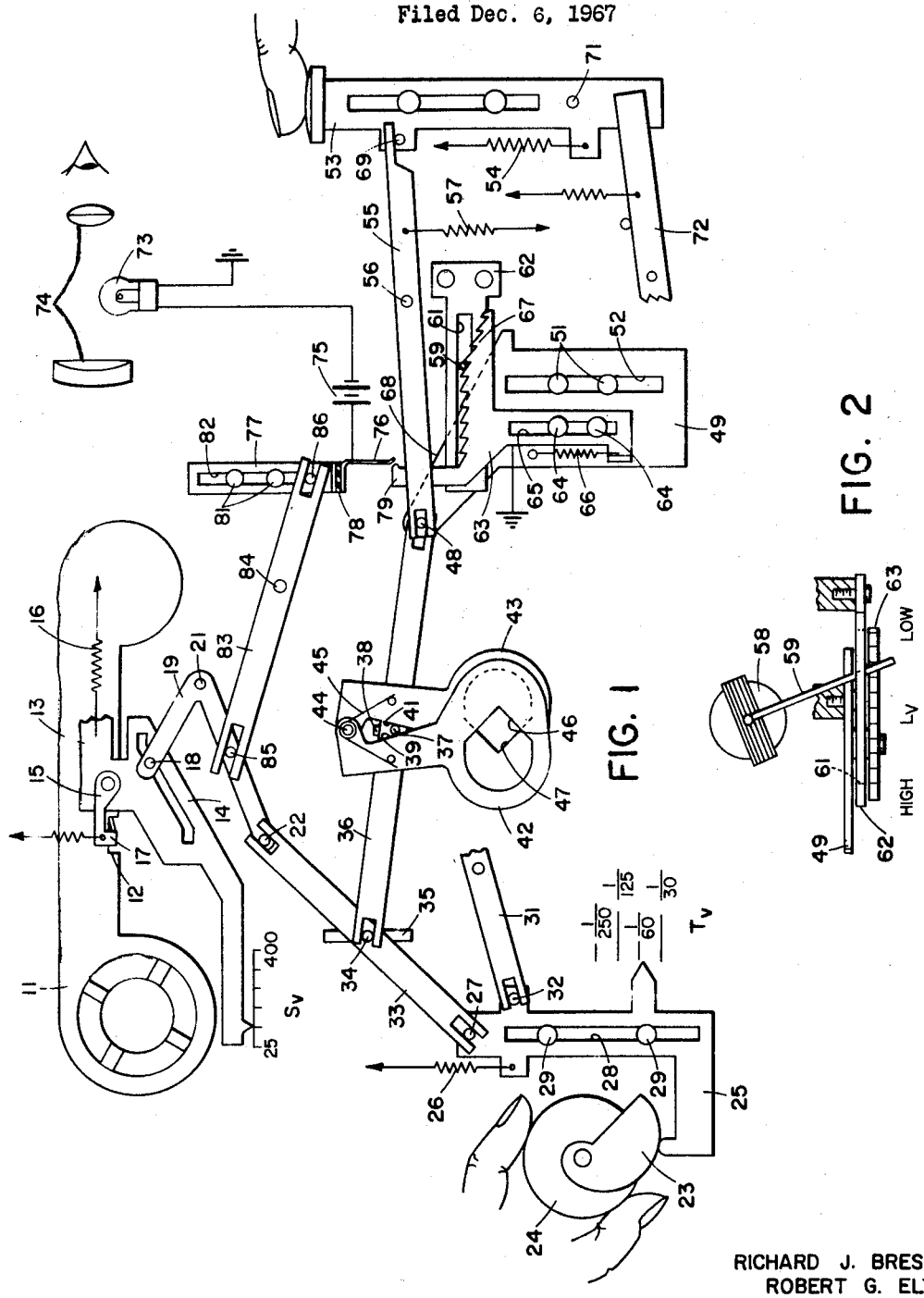
RICHARD J. BRESSON
ROBERT G. ELTON
INVENTORS
BY Robert W Hampton
William C. Oxon, III
ATTORNEYS

United States Patent Office 3,500,731
Patented Mar. 17, 1970

3,500,731
ADJUSTABLE LOW-LIGHT SIGNAL
Richard Joseph Bresson, Rochester, and Robert George Elton, Spencerport, N.Y., assignors to Eastman Kodak Company, Rochester, N.Y., a corporation of New Jersey
Filed Dec. 6, 1967, Ser. No. 688,460
Int. Cl. G01j 1/00, 1/52; G03b 9/02
U.S. Cl. 95—10      12 Claims

ABSTRACT OF THE DISCLOSURE

A camera low-light-signal device provides a warning signal when the illumination of a subject to be photographed is below a level determined by the position of a film-sensitivity-sensing member. An exposure control adjusting system controls the actuation of the low-light-signal device prior to actuation of the shutter of the camera.

CROSS-REFERENCE TO RELATED APPLICATION

Reference is made to commonly assigned copending U.S. patent application Ser. No. 437,221, Low Light and Flash Indicator for Cameras, filed on Mar. 4, 1965 in the name of William T. Hochreiter, issued as U.S. Patent No. 3,374,718 on Mar. 26, 1968.

BACKGROUND OF THE INVENTION

Field of the invention

The present invention relates to still-or motion-picture cameras provided with photo-responsive, low-light-signal means, and particularly to such cameras including automatic-exposure-control systems of the type in which a transducer element, such as the needle of a galvanometer, assumes a position functionally related to scene illumination, with the position of the needle serving to define the appropriate adjustment of an exposure-determining system comprising a variable-speed shutter or a variable-lens diaphragm or both.

Description of the prior art

In such cameras, it is known to provide a low-light signal adapted to function when a needle-sensing mechanism senses that the needle is in a position corresponding to scene illumination below a predetermined intensity level. Also, it is known to adjust an exposure-control system in accordance with the sensitivity of the film in the camera so that the exposure-determining system is adjusted as a combined function of film sensitivity and scene illumination.

One known means of accomplishing such film-sensitivity adjustment is by varying the response of the transducer, for example, by means of a variable resistor in the galvanometer circuit or by means of a variable mask adapted to alter the effective area of the photocell associated with the galvanometer. By such an arrangement, the position of the galvanometer needle is related both to the scene-illumination intensity and to film sensitivity, whereby both the exposure-control system and the low-light-signal system are adjusted accordingly. For various reasons, however, it is often preferable not to interfere with the response characteristics of the galvanometer once it has been calibrated initially, but rather to compensate for different film sensitivities by adjusting the linkage means comprising the exposure computer which sets the exposure-determining system in response to the position of the needle as sensed by the needle-sensing mechanism. A representative system of this type, similar to the system incorporated in the illustrated embodiment of the present invention, is disclosed in U.S. Patent No. 3,125,939, issued to the assignee of the present invention on Mar. 24, 1964. In such a construction, however, a low-light-signal system responsive only to the position of the galvanometer needle would not take into account the film-sensitivity adjustment of the linkage means, and would function properly only when the camera was used with film of a particular sensitivity.

SUMMARY OF THE INVENTION

Therefore, the present invention relates to means for combining an automatically adjusted low-light-signal system with the latter type of exposure-control-adjusting system by associating the signal-actuating means with both a needle-sensing member and a movable element that is positioned as a function of film sensitivity. For example, the signal means can comprise a miniature electric bulb adapted to illuminate an element visible in the camera viewfinder when the bulb is energized by the closing of a switch comprising the signal-actuating means.

In many cameras utilizing a galvanometer type of exposure-control system, the progressive movement of the camera's operating member serves first to move the needle-sensing mechanism and thereafter to actuate the camera shutter, with the distance through which the sensing mechanism moves before engaging the needle being inversely related to scene brightness. Thus, if the signal were actuated by the same needle-sensing member used to adjust the exposure-determining means, the existence of a low-light situation would mean that the operating member would be almost at its shutter-actuating position before the signal were actuated in response to low scene illumination. Therefore, the relatively late occurrence of the signal would provide very little time for the operator to discontinue moving the operating member to avoid actuating the shutter.

To minimize that problem, the illustrated preferred embodiment of this invention utilizes a needle-sensing mechanism related to the one shown in commonly assigned copending U.S. patent application Ser. No. 437,221, filed on Mar. 4, 1965 in the name of William T. Hochreiter and issued as U.S. Patent No. 3,374,718 on Mar. 26, 1968, wherein two needle-sensing members are employed. One of those members detects the presence of the needle in a low-light position during an early stage of movement of the operating member to actuate the signal without interfering with the other member, the latter being movable through a longer path to sense the needle position for purposes of adjusting the exposure-determining means. The needle-detecting member employed in the present invention is unlike that disclosed in the above-identified patent application, however in that it is adapted to assume various progressive positions corresponding to progressively different low-light positions at which the needle can be detected rather than simply by-passing the needle if it is in any of such low-light positions. Accordingly, by mounting one contact point of the previously described switch on the needle-detecting member and the other contact point on a member positioned in accordance with film sensitivity, the signal bulb is caused to be energized during the initial movement of the operating member when scene illumination is below the minimum level at which the camera can produce a satisfactory exposure on film of the particular sensitivity to which the system is adjusted.

Various means for accomplishing the invention will be apparent from the following detailed description of a preferred embodiment thereof, reference being made to the accompanying drawing.

BRIEF DESCRIPTION OF THE DRAWING

FIG. 1 is a simplified illustration of the overall automatic-exposure-control and low-light-signal mechanism; and FIG. 2 is a top plan view of a portion of the mechanism shown in FIG. 1 comprising the galvanometer and the needle-position-sensing device associated therewith.

DESCRIPTION OF THE PREFERRED EMBODIMENT

Referring first to FIG. 1, a film cassette 11, which is adapted to be received in a camera, is provided with a film-code notch 12, the position of which is determined by the sensitivity rating of the particular film within the cassette. When the camera back (not shown) is opened, slide member 13, cam element 14, and notch-sensing lever 15, which comprise a film-speed-sensing mechanism, are all pulled to the left of their illustrated positions against the bias of spring 16. When the camera operator closes the back of the camera after inserting the cassette, the film-speed-sensing mechanism is freed to move to the right under the influence of spring 16 until lug 17 of notch-sensing lever 15 enters, and is blocked by, film-code notch 12.

The further the film-speed-sensing mechanism moves to the right under the influence of spring 16 prior to the engagement of lug 17 with film-code notch 12, the lower the cam-follower pin 18 is driven by the cam surface of cam element 14. Pin 18 is attached to one end of bell crank 19 which, in turn, is attached to the camera's mounting plate by pivot 21. It can be seen that, as the film-speed-sensing mechanism moves to the right, bell crank 19 is rotated in a counter-clockwise direction, as viewed in FIG. 1, about pivot 21. The position of bell crank 19 determines the position of film-speed stud 22 attached thereto, thus providing the film-speed ($S_v$) input to the computer mechanism.

Shutter speed ($T_v$) is fed into the computer by rotating shutter-speed cam 23 which is positioned by an externally accessible knob 24. The speed slide 25 is biased against cam 23 by spring 26 and supports shutter-speed stud 27 attached to its upper end. Slide 25 moves in a vertical track determined by slot 28 and pins 29 attached to the camera's mounting plate, and is connected to a shutter-speed-regulating lever 31 by means of a pin 32 to adjust the speed of the camera shutter in a known manner.

A film- and shutter-speed lever 33 is keyed at its lower end to shutter-speed stud 27 and at its upper end to film-speed stud 22, whereby film- and shutter-speed stud 34, attached to the center of lever 33, is positioned to move vertically within slot 35 in the mounting plate as a function of settings ($S_v$) and ($T_v$).

The film- and shutter-speed stud 34 is received by the slotted corresponding end of diaphragm-control lever 36, which is provided with a centrally located diaphragm-control stud 37 received in a vertical guide slot 38 in the mounting plate. The opposite end of stud 37 extends between the respective cam surfaces 39 and 41 of diaphragm blades 42 and 43, respectively, which are pivotally connected to the mounting plate by a pin 44 and urged into overlapping relation to one another by a light hairpin spring 45. Accordingly, as stud 37 moves upwardly in slot 38, the diaphragm blades progressively overlap to increase the lens aperture defined by the cooperation of openings 46 and 47 in the respective blades.

At its end opposite the receiving stud 34, diaphragm-control lever 36 is slotted to receive actuating stud 48 on needle-sensing cam member 49, which is supported for vertical sliding movement by pins 51 extending through slot 52 and into a stationary portion of the camera structure.

When operating slide 53 is depressed, overcoming the tension of heavy spring 54, actuating lever 55 is released for clockwise movement, as viewed in FIG. 1, about pivot 56 under the influence of its spring 57, whereby cam member 49 is raised by stud 48 received in the corresponding slotted end of actuating lever 55.

As shown in FIG. 2, a galvanometer device 58, comprising a part of the camera's conventional photo-responsive circuitry, is located adjacent to cam member 49 and is provided with a movable galvanometer needle 59 extending through slot 61 in stationary plate 62 at a position functionally related to scene brightness ($L_v$). Stationary plate 62 is supported on an immovable portion of the camera frame between the adjacent upper ends of needle-sensing cam member 49 and needle-clamping slide 63, which is slidably attached to cam member 49 by pins 64 extending through slot 65 and urged upwardly relative to cam member 49 by a light spring 66.

As needle-sensing cam member 49 moves upwardly in response to depression of operating slide 53, tooth surface 67 of needle-clamping slide 63 comes into engagement with 59 and traps it at its position along slot 61, whereupon cam member 49 continues its upward movement until its cam surface 68 engages trapped needle 59 to block cam member 49 in a position corresponding to the existing level of scene illumination.

Since needle-sensing cam member 49 thus positions one end of diaphragm-control lever 36 as a function of scene illumination, with the other end of lever 36 being similarly positioned as a function of film sensitivity and shutter speed, it is apparent that the resulting location of stud 37 within slot 38 effects an appropriate diaphragm adjustment as determined by all three of those variable factors. If the upward movement of needle-sensing cam member 49 raises stud 37 to the top of slot 38 (i.e., opens the diaphragm to its maximum aperture) before needle 59 is engaged by cam surface 68, continued upward movement of cam member 49 causes lever 36 to pivot about stud 37 to override the manually established shutter-speed setting by depressing slide 25 out of engagement with cam 23. This overriding feature is more fully explained in the aforementioned U.S. Patent No. 3,125,939 and prevents the manual shutter-speed setting from positively limiting the maximum exposure of which the camera is otherwise capable.

When the exposure-determining mechanism has thus been adjusted in accordance with film sensitivity, shutter speed, and scene illumination, further clockwise movement of actuating lever 55, as viewed in FIG. 1, is blocked and pin 69 on operating slide 53 moves downwardly away from lever 55 as slide 53 continues to be depressed to a position in which pin 71 engages and moves shutter-release lever 72 to operate the shutter mechanism.

The low-light-signal system comprises a lamp 73 disposed so that its illumination is visible in the camera viewfinder, represented by lenses 74. The lamp-energization circuit includes a battery 75 connected in series with the lamp filament through a normally open switch comprising contact element 76, supported on slide member 77 by insulator 78, and a grounded contact arm 79 extending upwardly from needle-clamping slide 63. Thus, grounded lamp 73 is energized when contact arm 79 is moved upwardly into engagement with contact element 76.

When needle 59 is positioned above any of the horizontally aligned teeth along tooth surface 67 of slide 63, i.e., when the scene illumination is above a predetermined level, it is apparent that upward movement of slide 63 will be blocked at the illustrated position. Accordingly, with contact element 76 located, as illustrated, out of engagement with contact arm 79 when slide 63 is so positioned, but sufficiently close to arm 79 to be engaged thereby when needle 59 is anywhere to the right of its illustrated position, signal lamp 73 will be energized during depression of operating slide 53 if the scene illumination is below a level corresponding to the illustrated position of needle 59. Therefore, if the sensitivity of the particular film in the camera is such that the maximum exposure afforded by the exposure-control system is insufficient to expose the film properly at levels of scene illumnation below that at which needle 59 is at its illustrated position, the operator will be alerted to the impossibility of producing an acceptable exposure. Similarly, if the signal fails to appear, he can be confident of a proper exposure. If the film in the camera were of higher sensitivity, however, the occurrence of the signal would not necessarily preclude the possibility of making a proper exposure. And, in the case of a lower film sensitivity, the absence of the signal would not necessarily mean the presence of sufficient illumination. In other words, without additional adjustment means, the system is capable of providing a meaningful signal only when the camera is loaded with film of one predetermined sensitivity, as in the case of the related mechanism shown in the aforementioned U.S. Patent No. 3,125,939.

In order to overcome this severe limitation, the illustrated structure also includes means for adjusting the signal system automatically according to the sensitivity of the particular film with which the camera is loaded by means of the code-sensing structure which also serves to adjust the computer mechanism of the automatic-exposure-control system. For this purpose, contact element 76 is not fixed at a single position but is carried by adjustable slide member 77, supported for movement toward and away from contact arm 79 by means of pins 81 extending through slot 82 and into the camera's mounting plate or some other stationary camera element. The position of slide member 77, and thereby of contact element 76, is defined by signal-control lever 83, supported by a fixed pivot pin 84 and notched at its opposite ends to receive studs 85 and 86 on bell crank 19 and slide member 77, respectively.

As previously described, the angular position of bell crank 19 is determined by film-sensitivity-coding notch 12 on film cassette 11, which, therefore, also establishes the vertical position of slide 77, i.e., the higher the film sensitivity the higher will be the position of slide 77. Likewise, due to the sloped profile of the end portion of tooth surface 67, the height to which clamping slide 63 is movable is inversely related to scene illumination within the range of illumination levels which may present a low-light situation. In other words, within the low-light range, progressively lower levels of illumination will cause clamping slide 63 to assume corresponding progressively higher positions defined by the notches along the sloped portion of tooth surface 67, which can be smaller and more numerous than shown to provide greater discrimination between different low-light levels. Accordingly, if cassette 11 is loaded with film of the lowest sensitivity that can be accommodated by the computer mechanism, slide member 77 is moved to its lowermost position and needle clamping slide 63 will engage needle 59 and be blocked thereby with contact arm 79 not yet in engagement with contact element 76 if the light level is sufficient to position needle 59 anywhere along the horizontal portion of tooth surface 67. If needle 59 is located at any position aligned with the sloped portion of tooth surface 67, however, needle clamping slide 63 will move sufficiently to close the lamp circuit before engaging needle 59. If cassette 11 contains film of greater sensitivity, slide 77 will be located at a correspondingly higher position so that further upward movement of clamping slide 63 will be required to energize the signal, i.e., the signal will operate only when needle 59 is closer to the right end of slot 61, indicating the existence of a lower level of scene illumination. Therefore, it will be seen that, by relating properly the profile of tooth surface 67 to the geometry of the mechanism used to adjust contact element 76, the signal system can be made automatically adjustable to respond meaningfully when the camera is loaded with film of different sensitivity ratings.

Since the signal will occur, if at all, during the initial phase of the downward movement of operating slide 53, the operator is thereby afforded maximum opportunity to discontinue such movement to prevent actuating the shutter. If he desires to ignore the signal, for example, when a flash device is also being used, he can actuate the shutter simply by continuing to depress operating member 53.

While a lamp is illustrated as comprising the signal device, it should be apparent that a buzzer or other electrically operated warning unit could also be employed for the same purpose, and that the low-light signal could cooperate with a flashbulb-testing device or the like, as disclosed in the above-identified patent application. Likewise, rather than employing an electrically operated signal, the camera might include a flag member or the like movable mechanically to a warning position in response to movement of clamping slide 63 into a predetermined relation to adjustable slide member 77.

The invention has been described in detail with particular reference to a preferred embodiment thereof, but it will be understood that variations and modifications can be effected within the spirit and scope of the invention as described hereinabove.

We claim:

1. For use with a camera receiving a film supply having a film supply having coding means to indicate film sensitivity, a signaling apparatus for indicating whether illumination of a subject to be photographed is within a range determined by said film sensitivity, said signaling apparatus comprising:
   (a) sensing means responsive to said coding means for providing a first input to said apparatus indicative of said film sensitivity;
   (b) photo-responsive means for providing a second input to said apparatus indicative of the level of said illumination; and
   (c) signal means responsive to said first and second inputs for indicating whether said level of illumination is within said range.

2. For use with a camera receiving a film supply having tactile coding means to indicate film sensitivity, the signaling apparatus claimed in claim 1 wherein said sensing means senses tactually said coding means to provide said first input indicative of said film sensitivity.

3. The signaling apparatus claimed in claim 1 wherein:
   (a) said sensing means includes a first input member movable in response to said coding means to a position indicative of said film sensitivity;
   (b) said photo-responsive means includes a second input member movable relative to said first input member in response to said illumination to a position indicative of said level; and
   (c) said signal means is responsive to said positions.

4. In a photographic camera operatable with films of different sensitivities and having exposure-control means for determining the amount of scene illumination to be admitted for photographic exposure of the film being used in said camera, film-sensitivity-responsive means coupled to said exposure-control means for adjustment thereof in accordance with the sensitivity of said film, and photo-responsive means coupled to said exposure-control means for adjustment thereof in accordance with the level of scene illumination present, a signaling apparatus comprising:
   (a) first sensing means coupled to said film-sensitivity-responsive means for providing a first input to said apparatus indicative of said film sensitivity;

(b) second sensing means coupled to said photo-responsive means for providing a second input to said apparatus indicative of said level of scene illumination; and (c) signal means responsive to said first and second inputs for indicating whether said level of scene illumination is within a range thereof determined by said film sensitivity.

5. The apparatus claimed in claim 4 wherein:

(a) said first sensing means includes a first input member movable by said film-sensitivity-responsive means to a position providing said first input indicative of said film sensitivity;

(b) said second sensing means includes a second input member movable relative to said first input member by said photo-responsive means to a position providing said second input indictive of said level of scene illumination; and (c) said signal means is responsive to said positions providing said first and second inputs to indicate whether said level is within said range.

6. In a photographic camera receiving a film supply provided with tactile coding means for indicating film sensitivity, said camera including exposure-control means for determining the amount of scene illumination to be admitted for photographic exposure of the film supplied, code-responsive means for detecting tactually said film sensitivity and coupled to said exposure-control means for adjustment thereof in accordance with said film sensitivity, and photo-responsive menas coupled to said exposure-control means for adjustment thereof in accordance with the level of scene illumination present, a signaling apparatus, comprising:

(a) first sensing means coupled to said code-responsive means for providing a first input to said apparatus indicative of said film sensitivity;

(b) second sensing means coupled to said photo-responsive means for providing a second input to said apparatus indicative of said level of scene illumination; and (c) signal means responsive to said first and second inputs for indicating whether said level of scene illumination is within a range thereof determined by said film sensitivity.

7. For use with a camera receiving a film supply having tactile coding means to indicate film sensitivity, a signaling apparatus for indicating whether the level of scene illumination is within a range thereof determined by said film sensitivity, said signaling apparatus comprising:

(a) a movable detecting member responsive to said coding means to detect tactually said film sensitivity;

(b) a movable signal-control member coupled to said directing member for movement thereby to a position indicative of said film sensitivity;

(c) photo-responsive means including a sensing member movable relative to said signal-control member in response to said illumination to a position indicative of said level; and (d) signal means responsive to said positions for indicating whether said level is within said range.

8. The signaling apparatus claimed in claim 7 including movable linkage means coupling said detecting member and said signal-control member.

9. The signaling apparatus claimed in claim 7 wherein said signal-control member is engageable by said sensing member, and said signal means is responsive to engagement of said signal-control member by said sensing member.

10. In a photographic camera receiving a film supply provided with tactile coding means to indicate film sensitivity and including exposure-control means for determining the amount of scene illumination to be admitted for photographic exposure of the film supplied, movable code-responsive means for detecting tactually said film sensitivity and coupled to said exposure-control means for adjustment thereof in accordance with said film sensitivity, and photo-responsive means for sensing the level of scene illumination present and coupled to said exposure-control means for adjustment thereof in accordance with said level, a signaling apparatus to indicate whether said level of scene illumination is within a range thereof determined by said film sensitivity wherein:

(a) a movable signal-control member is coupled to said code-responsive means for movement thereby to a position indicative of said film sensitivity;

(b) said photo-responsive means includes:

(1) a first movable sensing member coupled to said exposure-control means for adjustment thereof in accordance with said level, (2) a second sensing member movably supported on said first movable sensing member for movement therewith to a position indicative of said level, said first movable sensing member being movable relative to said second sensing member to complete said adjustment after said second sensing member has reached said position indicative of said level, and (3) resilient means interconnecting said first and second sensing members for biasing to bias said sensing members against relative movement therebetween; and (c) signal means responsive to a predetermined relationship between said positions of said signal-control member and said second sensing member for indicating whether said level is within said range.

11. The signaling apparatus claimed in claim 10 wherein:

(a) said photo-responsive means further includes a movable transducer member responsive to said scene illumination for movement to a position indicative of said level and engageable by said first and second sensing members;

(b) said second sensing member includes:

(1) a first portion engageable with said transducer member when said level is not within said range for blocking the movement of said second sensing member at its position indicative of such level, (2) a second portion engageable with said transducer member when said level is within said range for blocking the movement of said second sensing member at its position indicative of such level, and (3) a third portion engageable with said signal-control member when said level is within said range for energizing said signal means; and (c) said first sensing member includes a portion engageable with said transducer member for blocking the movement of said first sensing member after the movement of said second sensing member has been blocked by said transducer member.

12. The signaling apparatus claimed in claim 11 wherein:

(a) said transducer member comprises a galvanometer needle movable only in a plane transverse to the movements of said first and second sensing members to positions indicative of said level and engageable by said first and second sensing members;

(b) said first and second portions of said second sensing member comprise a continuous sawtooth edge for trapping said needle in its position upon engagement by said edge, said first portion extending in a direction substantially parallel with said plane in which said needle is movable, said second portion adjoining and forming an obtuse angle with said first portion; and (c) said portion of said first sensing member comprises a smooth straight edge extending in a direction substantially parallel with said second portion of said second sensing member.

References Cited

UNITED STATES PATENTS

| 3,048,091 | 8/1962 | Strehle. |
| 3,125,939 | 3/1964 | Bundschuh et al. |
| 3,171,337 | 3/1965 | Fischer. |
| 3,232,191 | 2/1966 | Sherwood. |
| 3,301,153 | 1/1967 | Ataka. |
| 3,368,467 | 2/1968 | Hahn. |

NORTON ANSHER, Primary Examiner

JOSEPH F. PETERS, Jr., Primary Examiner

U.S. Cl. X.R.

95—31, 64

PO-1050
(5/69)

UNITED STATES PATENT OFFICE
CERTIFICATE OF CORRECTION

Patent No. 3,500,731          Dated March 17, 1970

Inventor(s) Richard J. Bresson and Robert G. Elton

It is certified that error appears in the above-identified patent and that said Letters Patent are hereby corrected as shown below:

Column 6, line 32, delete "having a film supply".

Column 7, line 30, "menas" should be "means".

Column 7, line 55, delete "directing" and insert "detecting".

Column 8, line 27, delete "to bias".

Column 8, line 30, before "responsive" insert "are".

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents